(12) United States Patent
Kim et al.

(10) Patent No.: US 8,626,132 B2
(45) Date of Patent: Jan. 7, 2014

(54) DIGITAL DEVICE AND METHOD FOR PROVIDING ADDITIONAL SERVICE BY USING THE SAME

(75) Inventors: Young-Sung Kim, Gwacheon-si (KR); Tae-Hyo Ahn, Seoul (KR); Yeon-Dae Kim, Seoul (KR); Hae-Young Song, Seoul (KR); Won-Taik Hwang, Seoul (KR); Sang-Youn Lee, Seoul (KR); Yoon-Kyoo Jung, Seoul (KR); Sun-Jung Lee, Seoul (KR); Tae-Kyun Kim, Goyang-si (KR)

(73) Assignee: KT Corporation, Seongnam (KR)

( * ) Notice: Subject to any disclaimer, the term of this patent is extended or adjusted under 35 U.S.C. 154(b) by 1125 days.

(21) Appl. No.: 12/239,988

(22) Filed: Sep. 29, 2008

(65) Prior Publication Data

US 2009/0029738 A1    Jan. 29, 2009

Related U.S. Application Data

(63) Continuation of application No. PCT/KR2007/001503, filed on Mar. 27, 2007.

(30) Foreign Application Priority Data

Mar. 29, 2006 (KR) .......................... 10-2006-0028518
Apr. 26, 2006 (KR) .......................... 10-2006-0037818

(51) Int. Cl.
*H04M 3/42* (2006.01)
(52) U.S. Cl.
USPC .................... 455/414.1; 455/404.1; 455/521; 367/76; 342/50
(58) Field of Classification Search
USPC .......................... 455/414.1, 552.1, 553.1, 558
See application file for complete search history.

(56) References Cited

U.S. PATENT DOCUMENTS 5,918,172 A * 6/1999 Saunders et al. ........... 455/404.1
6,205,327 B1 * 3/2001 Sentinelli ..................... 455/407
(Continued)

FOREIGN PATENT DOCUMENTS

JP   11-068988   3/1999
JP   11-196463   7/1999
(Continued)

OTHER PUBLICATIONS

International Search Report for International Application No. PCT/KR2007/001503 dated Jun. 12, 2007 by Korean Intellectual Property Office.

(Continued)

*Primary Examiner* — Charles Appiah
*Assistant Examiner* — Xiang Zhang
(74) *Attorney, Agent, or Firm* — Sughrue Mion, PLLC

(57) ABSTRACT

A digital processing device capable of receiving an additional service is disclosed. In one aspect, a digital processing device includes i) an input unit, inputting a signal, ii) a subscriber identity unit, storing an identity code of a communication operator and generating a communication network access request message, iii) an additional service identity unit, storing an identity code of an additional service operator and generating an additional service request message and v) a control unit, generating a control signal allowing one of the subscriber identity unit and the additional service identity unit to be selectively driven. In accordance with at least one inventive embodiment, a user of the digital processing device can receive an additional service without his or her subscription to a specific communication operator and use various additional services in addition to the additional services provided by the subscribed communication operator.

18 Claims, 8 Drawing Sheets

(56) References Cited

U.S. PATENT DOCUMENTS

| | | | |
|---|---|---|---|
| 7,561,896 B2 * | 7/2009 | Csapo et al. | 455/558 |
| 2001/0016917 A1 * | 8/2001 | Haubold | 713/322 |
| 2002/0065849 A1 * | 5/2002 | Ferguson et al. | 707/513 |
| 2002/0082847 A1 * | 6/2002 | Vandewalle et al. | 705/1 |
| 2003/0086571 A1 * | 5/2003 | Audebert et al. | 380/277 |
| 2004/0152445 A1 * | 8/2004 | Muller | 455/410 |
| 2005/0085244 A1 * | 4/2005 | Choi et al. | 455/466 |
| 2006/0063565 A1 * | 3/2006 | Ueno | 455/558 |
| 2006/0189296 A1 * | 8/2006 | Sevilla | 455/405 |
| 2007/0129057 A1 * | 6/2007 | Xu et al. | 455/410 |
| 2008/0132226 A1 * | 6/2008 | Carnall | 455/425 |

FOREIGN PATENT DOCUMENTS

| | | |
|---|---|---|
| JP | 2000-222537 A | 8/2000 |
| KR | 10-2001-0055470 A | 7/2001 |
| KR | 10-2003-0015940 A | 2/2003 |

OTHER PUBLICATIONS

Japanese Office Action in Application No. 2009-502672 Dated May 24, 2011.

* cited by examiner

DIGITAL DEVICE AND METHOD FOR PROVIDING ADDITIONAL SERVICE BY USING THE SAME

RELATED APPLICATIONS

This application is a continuation application, and claims the benefit under 35 U.S.C. §§120 and 365 of PCT Application No. PCT/KR2007/001503, filed on Mar. 27, 2007, which is hereby incorporated by reference.

BACKGROUND OF THE INVENTION

1. Field of the Invention

The present invention relates to a digital processing device, more specifically to a digital processing device and a method for providing an additional service by using the same that can allow a subscriber to receive the additional service without the subscription to a specific communication operator by including an additional service identity module.

2. Description of the Related Technology

Sudden development of information and communication technologies causes the digital processing device to have more various multimedia functions such as a video game, a moving picture, wireless Internet, and a camera as well as communication, to thereby provide a variety of additional services by using the multimedia functions.

Particularly, a portable terminal, which is one of most popular digital processing devices, performs not only a call function of a simple communication device but also various multimedia functions such as a video game, a moving picture, wireless Internet, and a camera, and provides a variety of additional services supporting these functions.

SUMMARY OF CERTAIN INVENTIVE ASPECTS

One aspect of the present invention is a digital processing device and a method for providing an additional service by using the same that can allow a user to receive an additional service without his or her subscription to a specific communication operator.

Another aspect of the present invention is a digital processing device and a method for providing an additional service by using the same that an additional service provider is not subordinated to a communication operator and is able to independently provide the additional service to a user.

Another aspect of the present invention is a digital processing device and a method for providing an additional service by using the same that can allow a user to use various additional services in addition to limited additional services provided by the subscribed communication operator.

Another aspect of the present invention is a digital processing device including an input unit, inputting a signal; a subscriber identity unit, storing an identity code of a communication operator and generating a communication network access request message; an additional service identity unit, storing an identity code of an additional service operator and generating an additional service request message; and a control unit, generating a control signal allowing one of the subscriber identity unit and the additional service identity unit to be selectively driven The subscriber identity unit further can store subscriber authentication and charging information related to the communication operator.

The additional service identity unit can further include and stores subscriber authentication and charging information related to the additional service operator.

At least one of the subscriber identity unit and the additional service identity unit can be plurally provided.

At least one of the subscriber identity unit and the additional service identity unit can be an outside-mounted device in a form of a card or chip.

The additional service identity unit can be mounted inside of the digital processing device, and the subscriber identity unit can include the outside-mounted device. Also, the additional service can access the communication network by using information stored in the inside-mounted additional service identity unit if the subscriber identity unit is not coupled.

The communication network can employ at least one of a wideband code division multiple access (WCDMA) method and a global system for mobile communication method.

Another aspect of the present invention is a method for providing an additional service by an additional service providing device, which is connected to a digital processing device through a communication network device.

Another aspect of the present invention is a method for providing an additional service by an additional service providing device, which is connected to a digital processing device through a communication network device, including receiving an addition service request message, transmitted through the digital processing device, from the communication network device; extracting authentication information included in the additional service request message; and transmitting additional service data according to the extracted authentication information, whereas the digital processing device includes an additional service identity unit and generates the additional service request message including an additional service identity code, included in the additional service identity unit, and the authentication information, and the communication network device transmits the additional service request message to the additional service providing device according to the additional service identity code included in the additional service request message.

The transmitting of the additional service data according to the extracted authentication information further can include encoding the additional service data, and the encoded additional service data can be decoded in the digital processing device.

The additional service identity code and the authentication information, included in the additional service request message, can be stored in means mounted inside or outside of the digital processing device.

The digital processing device can further include a subscriber identity unit, storing a communication operator identity code and generating a communication network request message, and the additional service identity unit can be mounted inside of the digital processing device, and the subscriber identity unit can be mounted outside of the digital processing device.

The operation that the digital processing device transmits the additional service request message can include identifying the connection of the outside-mounted subscriber identity unit; reading authentication information from the inside-mounted additional service identity unit if the connection of the outside-mounted subscriber identity unit is not identified; generating an additional service request message including the read authentication information; and transmitting the generated additional service request message to the communication network device.

In the identifying of the connection of the outside-mounted subscriber identity unit, the connection can be identified by an interrupt signal generated if the outside-mounted subscriber identity unit is connected.

The communication network can also employ at least one of a wideband code division multiple access (WCDMA) method and a global system for mobile communication method.

Another aspect of the present invention is a recorded medium having recorded a program including a typically realized command for executing a method for providing an additional service by an additional providing device, which is connected to a digital processing device through a communication network.

Another aspect of the present invention is a recorded medium having recorded a program including a typically realized command for executing a method for providing an additional service, the command being able to be executed by an additional service providing device such that the additional service can be transmitted to a digital processing device through a communication network, and the recorded medium being readable by an electronic device, including receiving an addition service request message, transmitted through the digital processing device, from the communication network device; extracting authentication information included in the additional service request message; and transmitting additional service data according to the extracted authentication information, whereas the digital processing device includes an additional service identity unit and generates the additional service request message including an additional service identity code, included in the additional service identity unit, and the authentication information, and the communication network device transmits the additional service request message to the additional service providing device according to the additional service identity code included in the additional service request message.

The transmitting of the additional service data according to the extracted authentication information further can include encoding the additional service data, and the encoded additional service data can be decoded in the digital processing device.

The additional service identity code and the authentication information, included in the additional service request message, can be stored in means mounted inside or outside of the digital processing device.

The digital processing device can further include a subscriber identity unit, storing a communication operator identity code and generating a communication network request message, and the additional service identity unit can be mounted inside of the digital processing device, and the subscriber identity unit can be mounted outside of the digital processing device.

The operation that the digital processing device transmits the additional service request message can include identifying the connection of the outside-mounted subscriber identity unit; reading authentication information from the inside-mounted additional service identity unit if the connection of the outside-mounted subscriber identity unit is not identified; generating an additional service request message including the read authentication information; and transmitting the generated additional service request message to the communication network device.

In the identifying of the connection of the outside-mounted subscriber identity unit, the connection can be identified by an interrupt signal generated if the outside-mounted subscriber identity unit is connected.

The communication network can also employ at least one of a wideband code division multiple access (WCDMA) method and a global system for mobile communication method.

Another aspect of the present invention is an additional service providing system, which provides an additional service to a digital processing device through a communication network.

Another aspect of the present invention is an additional service providing system, which provides an additional service to a digital processing device including an additional service identity unit, including a communication network device, receiving an additional service operator identity code, included in the additional service identity unit of the digital processing device, and an additional service providing request message including additional service authentication information from the digital processing unit; and an additional service providing device, receiving the additional service providing request message from the communication network device and transmitting additional service data to the digital processing device, whereas the communication network device extracts the additional service operator identity code, included in the additional service providing request message, and transmits the additional service providing request message to the additional service providing device corresponding to the extracted additional service operator identity code, and the additional service providing device extracts the authentication information included in the additional service providing request message and transmits the additional service data according to the extracted authentication information.

The digital processing device can store the additional service identity code and the authentication information, included in the additional service request message, in means mounted inside or outside of the digital processing device.

The additional service providing device can encode the additional data, and the encoded additional service data is decoded in the digital processing device.

The digital processing device further includes a subscriber identity unit, storing a communication operator identity code and generating a communication network request message, and the additional service identity unit is mounted inside of the digital processing device, and the subscriber identity unit is mounted outside of the digital processing device.

The additional service can access the communication network by using information stored in the inside-mounted additional service identity unit if the subscriber identity unit is not coupled, and the communication network can employ at least one of a wideband code division multiple access (WCDMA) method and a global system for mobile communication method.

Another aspect of the invention is a digital processing device for accessing a communication network and receiving an additional service, the device comprising: an input unit configured to receive a signal; a subscriber identity unit configured to store an identity code of a communication operator and generate a communication network access request message; an additional service identity unit configured to store an identity code of an additional service operator and generate an additional service request message; and a control unit configured to generate, based on the received signal, a control signal configured to selectively drive one of the subscriber identity unit and the additional service identity unit.

In the above device, the subscriber identity unit is further configured to store subscriber authentication and charging information related to the communication operator, and the additional service identity unit is further configured to store subscriber authentication and charging information related to the additional service operator.

In the above device, at least one of the subscriber identity unit and the additional service identity unit is plurally provided. In the above device, at least one of the subscriber identity unit and the additional service identity unit is located outside the digital processing device in the form of a card or chip. In the above device, the additional service identity unit is formed inside the digital processing device, and the subscriber identity unit is located outside the digital processing device. In the above device, the additional service is configured to access the communication network by the use of information stored in the additional service identity unit if the subscriber identity unit is not connected.

Another aspect of the invention is a method of providing an additional service via an additional service providing device, the method comprising: receiving an additional service request message, via a digital processing device, from a communication network device, wherein the digital processing device and communication network device are in data communication with the additional service providing device, wherein the digital processing device comprises an additional service identity unit and is configured to generate the additional service request message, and wherein the additional service request message comprises an additional service identity code and the authentication information; extracting authentication information from the additional service request message; and transmitting additional service data according to the extracted authentication information, wherein the communication network device is configured to transmit the additional service request message to the additional service providing device according to the additional service identity code.

In the above method, the transmitting comprises encoding the additional service data, and the encoded additional service data is decoded in the digital processing device. In the above method, the additional service identity code and the authentication information are stored in a memory located inside or outside the digital processing device. In the above method, the digital processing device farther comprises a subscriber identity unit, configured to store a communication operator identity code and generate a communication network request message, and the additional service identity unit is located inside the digital processing device, and the subscriber identity unit is located outside the digital processing device.

The above method further comprises: identifying the connection of the subscriber identity unit; reading authentication information from the additional service identity unit if the connection of the subscriber identity unit is not identified; generating an additional service request message comprising the read authentication information; and transmitting the generated additional service request message to the communication network device. In the above method, the identifying is performed by the use of an interrupt signal generated if the subscriber identity unit is connected.

Another aspect of the invention is one or more processor-readable storage devices having processor-readable code, the processor-readable code which, when executed by one or more processors, performs a method of providing an additional service via an additional service providing device, the method comprising: receiving an additional service request message, via a digital processing device, from a communication network device, wherein the digital processing device and communication network device are in data communication with the additional service providing device, wherein the digital processing device comprises an additional service identity unit and is configured to generate the additional service request message, and wherein the additional service request message comprises an additional service identity code and the authentication information; extracting authentication information from the additional service request message; and transmitting additional service data according to the extracted authentication information, wherein the communication network device is configured to transmit the additional service request message to the additional service providing device according to the additional service identity code.

In the storage devices, the digital processing device further comprises a subscriber identity unit, configured to store a communication operator identity code and generate a communication network request message, and the additional service identity unit is located inside the digital processing device, and the subscriber identity unit is located outside the digital processing device, wherein the method further comprises: identifying the connection of the subscriber identity unit; reading authentication information from the additional service identity unit if the connection of the subscriber identity unit is not identified; generating an additional service request message including the read authentication information; and transmitting the generated additional service request message to the communication network device.

Another aspect of the invention is an additional service providing system, which provides an additional service to a digital processing device including an additional service identity unit, the system comprising: a communication network device configured to receive an additional service operator identity code and an additional service providing request message from the digital processing unit, wherein the additional service providing request message comprises additional service authentication information and an additional service operator identity code; and an additional service providing device configured to receive the additional service providing request message from the communication network device and transmit additional service data to the digital processing device, wherein the communication network device is further configured to extract the additional service operator identity code from the additional service providing request message, and transmit the additional service providing request message to the additional service providing device corresponding to the extracted additional service operator identity code, and wherein the additional service providing device is further configured to extract the authentication information from the additional service providing request message and transmit the additional service data according to the extracted authentication information.

In the above system, the digital processing device is configured to store the additional service identity code and the authentication information in a memory located inside or outside the digital processing device. In the above system, the additional service providing device is further configured to encode the additional data, and wherein the digital processing device is further configured to decode the encoded additional service data. In the above system, the digital processing device further comprises a subscriber identity unit, configured to store a communication operator identity code and generate a communication network request message, and the additional service identity unit is located inside the digital processing device, and the subscriber identity unit is located outside the digital processing device. In the above system, the additional service providing device is further configured to access the communication network based on information stored in the additional service identity unit if the subscriber identity unit is not coupled.

Still another aspect of the invention is a digital processing device for accessing a communication network and receiving an additional service, the device comprising: a receiver configured to receive a signal; a subscriber identifier configured to store an identity code of a communication operator and generate a communication network access request message;

an additional service identifier configured to store an identity code of an additional service operator and generate an additional service request message; and a controller configured to generate, based on the received signal, a control signal configured to selectively drive one of the subscriber identity unit and the additional service identity unit.

Still another aspect of the invention is an apparatus for providing an additional service via an additional service providing device, which is connected to a digital processing device via a communication network device, the apparatus comprising: means for receiving an additional service request message, via the digital processing device, from the communication network device, wherein the digital processing device comprises an additional service identity unit and is configured to generate the additional service request message, and wherein the additional service request message comprises an additional service identity code and the authentication information, wherein the communication network device is configured to transmit the additional service request message to the additional service providing device according to the additional service identity code; means for extracting authentication information from the additional service request message; and means for transmitting additional service data according to the extracted authentication information.

DETAILED DESCRIPTION OF CERTAIN INVENTIVE EMBODIMENTS

Figure 1:
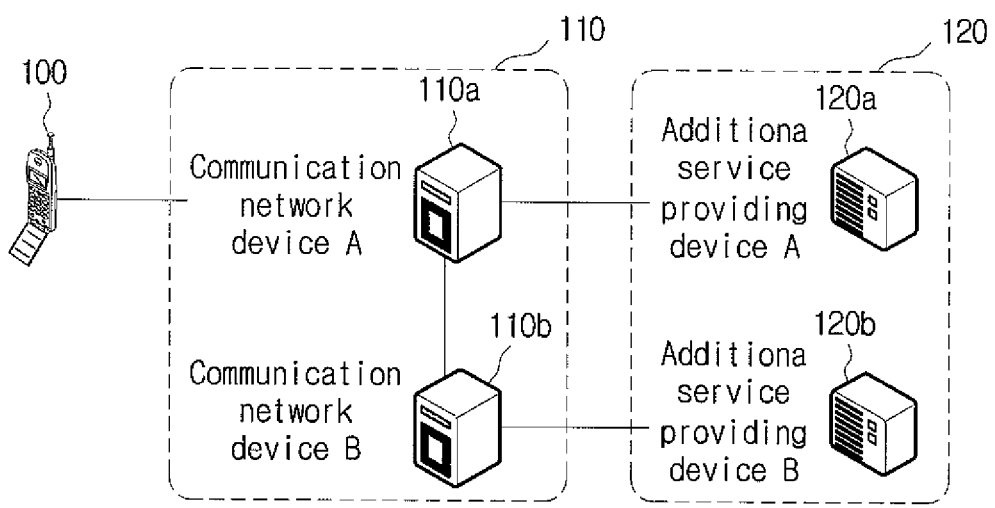
FIG. 1 is an example illustrating a structure of a typical communication system for providing the application service.

FIG. 1 is an example illustrating a structure of a typical communication system for providing the application service. As illustrated in FIG. 1, in case that there are a plurality of communication operators, there is provided each communication network device 110a and 110b, forming its communication network, offered by the respective communication operators. Also, there is provided each additional service providing device 120a and 120b offering additional services through the communication networks connected by the respective communication network devices 110a and 110b.

In this communication system, a user using the digital processing device 100 can limitedly access the only communication network devices 110a and 110b of the communication operator that the user subscribed to. For example, as illustrated in FIG. 1, if the user of the digital processing device 100 subscribes to an A communication operator, the user can access the only communication network device 110a provided by the A communication operator.

This is not only because frequency bands different from each other per communication operator are used or signal transmitting methods are different from each other but also because the user can limitedly access the only communication network device of the communication operator that the user subscribes to, by the subscriber identity module included in the digital processing device. However, this description is based on the only case of restricting the communication network device that can be accessed by the subscriber identity module.

The user, who desires to receive the additional service through the digital processing device, can be connected to the communication network device 111a only after accessing the communication network device 110a of the communication operator that the user subscribed to and undergoing the authenticating operation by using a subscriber identity module included in the digital processing device.

In case that the digital processing device, for example, the portable terminal employs the AMP (Advanced Mobile phone service)/CDMA (Code Division Multiple Access) method, the user must store an electronic serial number (ESN) for communicating with a base station in an EEPROM (Electrically Erasable Programmable Read Only Memory) inside of the portable terminal or couple an external chip or card, stored with the ESN, to the portable terminal, in order to receive the communication service.

Beside that, identity information of a communication service subscriber and a mobile network code (MNC), which is the code of the subscribed communication operator, must be stored to receive the communication service. A subscriber identity module (SIM) refers to the device or the program storing the ESN and the MNC. Accordingly, the user who desires to use the additional service can receive the additional service only after subscribing to a specific communication operator.

Also, the user is permitted to access the only communication network device of the communication operator that the user subscribed to. Thus, the user can receive the additional service provided by the communication operator offering the communication network or provided by the additional service providing device connected to the only communication network device of the communication operator.

The communication network devices of the respective communication operators must be connected to each other in order to receive the additional service from the additional service providing device connected to the only communication network device of another communication operator. The additional service can be provided, only in case that the connection network device 110a of the communication operator subscribed by the user provides authentication information to the connection network device 110b of another communication operator.

Accordingly, since the additional service provider is restricted to provide the additional service, the additional service provider is subordinated to the communication operator and is unable to independently provide the additional service to the user of the digital processing device.

Beside that, since the user of the digital processing device is permitted to use the limited additional service provided by the communication operator that the user subscribed to or must undergo an additional authenticating operation, it is limited to use various additional services.

Hereinafter, some embodiments will be described in detail with reference to the accompanying drawings. Identical or corresponding elements will be given the same reference numerals, regardless of the figure number for easy general understanding.

In one embodiment, a digital processing device refers to an electronic device having its compact size enough to make it handy for a user to carry in order to perform a function such as a video game and mobile communication. For example, the digital processing device can include not only a mobile communication terminal, a personal digital assistant (PDA) and a portable multimedia player (PDA) but also a laptop computer having a recent communication function and portability caused by its miniaturization.

In one embodiment, the additional service, which refers to the service accessing a communication network and receiving information such as a video game, music and a broadcasting program, is different from a communication service directly provided by an operator who provides a communication network such as mobile communication and wireless Internet. An additional service provider is called a contents provider (CP) or a service provider (SP).

First, the configuration of a digital processing device including an additional service identity module in accordance with one embodiment of the present invention will be described with reference to FIG. 2.

Figure 2:
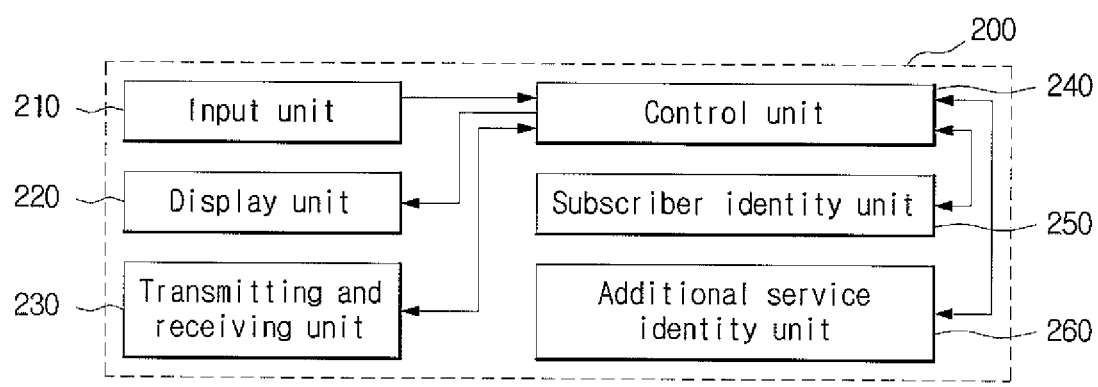
FIG. 2 is a block diagram illustrating the configuration of a digital processing device including an additional service identity module in accordance with an embodiment of the present invention.

FIG. 2 is a block diagram illustrating the configuration of a digital processing device 200 including an additional service identity module in accordance with an embodiment of the present invention.

As illustrated in FIG. 2, in accordance with the embodiment of the present invention, the digital processing device 200 can include an input unit 210, a display unit 220, a transmitting and receiving unit 230, a control unit 240, a subscriber identity unit 250 and an additional service identity unit 260.

The input unit 210 is means for receiving a control command and a function selecting command, for controlling the operation of the digital processing device. For example, the input unit 210 is realized as a plurality of key buttons (e.g. a number/character key and a symbol key of '*' or '#') and at least one function key (e.g. a menu key, a confirming key and a key for accessing wireless Internet) or in a form of a touch screen. Specially, the input unit 210 can be inputted with a command selectively driving the subscriber identity unit 250 and the additional service identity unit 260.

The display unit 220 performs the function of displaying video data, image data, character data and number data. For example, the display unit 220 can be a liquid crystal display (LCD).

The transmitting and receiving unit 230, which is connected to the additional service providing device through a communication network device forming the communication network, transmits information (e.g. an additional service providing request command), inputted through the input unit 210, to the additional service providing device. Also, the transmitting and receiving unit 230 can receive and transfer to the control unit 240, data (e.g. data of the additional service corresponding to the additional service providing request information) corresponding to information (e.g. additional service providing request information), inputted from the additional service providing device through input unit 210 and transferred.

The control unit 240 performs the function controlling each element (e.g. the input unit 210, the display unit, the transmitting and receiving unit 230, the subscriber identity unit 250 and additional service identity unit 260) of the digital processing device 200. According to a command, inputted through the input unit 210, selecting one of the subscriber identity unit 250 and additional service identity unit 260, the control unit 240 generates a control signal driving selected one.

The subscriber identity unit 250 and the additional service identity unit 260 generates a communication network access request message by using a mobile network code included in the subscriber identity unit 250 and the additional service identity unit 260, respectively, according to the control signal. The generated communication network access request message is transferred to the transmitting and receiving unit 230 and is transmitted to the communication network (more particularly, a device forming the communication network).

The subscriber identity unit 250, which includes a device or a program, designated as a subscriber identity module, stores the authentication, charging and security information of a communication service subscriber and provides the information to the communication network device. The subscriber identity module also stores a mobile network code (MNC), which is information defining a communication operator. The subscriber identity module can be mounted in a form of a chip inside or outside of the digital processing device 200 or be installed in a form of a program in the digital processing device 200, to be included in the subscriber identity unit 250.

The additional service identity unit 260, which includes a device or a program, designated as a subscriber identity module, stores the authentication, charging and security information of an additional service subscriber and provides the information to the additional service providing server or the additional service providing device. Like the subscriber identity unit 250, an additional service identity module also stores a mobile network code (MNC), which is information defining a communication operator. The additional service identity module can be mounted in a form of a chip inside or outside of the digital processing device 200 or be installed in a form of a program in the digital processing device 200, to be included in the additional service identity unit 260.

In one embodiment, the additional service identity module, which is to be identified differently from the subscriber identity module, refers to a program or a device, storing the MNC and authentication information of an additional service provider for providing the additional service.

The subscriber identity module (SIM, or user identity module (UIM)), which is a form of a card capable of being used in the mobile communication terminal or a module capable of being mounted inside thereof, refers to a chip or program storing information such that a variety of information can be provided. The subscriber identity unit 250 includes and drives the subscriber identity module. The additional service identity unit, similarly to the subscriber identity unit 250, also includes and drives the additional service identity module.

A part stored with information is stored in the form of the chip or card outside of the digital processing device. The generation of a request message with use of the actually stored information can be performed by a program pre-stored in the digital processing device.

For example, in case that the program, storing an only additional service MNC for providing the additional service to the chip, is pre-installed in the digital processing device, it is recognized that the chip stored with the additional service MNC is the additional identity module and the additional service identity unit 260, which is the program generating an additional service request message by mounting the additional service identity module, is driven. Accordingly, the subscriber identity unit 260 and the subscriber identity module are merely recognized according to the realized form. Similarly, the additional service identity unit 260 and the additional service identity module are merely recognized according to the realized form.

The subscriber identity module, in the case of receiving a mobile communication service especially through the mobile communication terminal, is to be provided with the mobile communication service through the only mobile communication terminal of each mobile communication operator. The present invention is not limited to the mobile communication terminal.

Through the mobile network code (MNC) included in the subscriber identity module, the communication network device of the communication operator is connected to the only digital processing device that a user subscribed to a specific communication operator by the subscriber identity module For example, if the user using the mobile communication attempts to make a call by using the mobile communication terminal, a communication network access request message is received from the mobile communication terminal including the MNC.

In accordance with the MNC included in the communication network access request message, a communication device of the mobile communication operator recognizes that the terminal making the call is the mobile communication terminal subscribed to its mobile communication service and provides the corresponding call service. Accordingly, the currently mobile communication terminal includes the MNC in the subscriber identity module as the default value, and the subscriber identity module is pre-stored inside of the mobile communication terminal.

Besides that, the additional service identity module refers to a chip or a program, storing information necessary to provide the services such as the authentication, charging and security information of an additional service subscriber requested to provide the addition service and includes a virtual MNC of the additional service provider providing the additional service.

In this description, the term, virtual MNC, is used to be distinguished from the MNC included in the subscriber identity module. However, the virtual MNC does not necessarily consist of only numbers indicating a specific phone number like the MNC included in the subscriber identity module.

Accordingly, in case that the additional service can be connected to a specific phone number and be received, the virtual MNC indicates the number (e.g. 700-000) referring to the operator providing the additional service. In case that the additional service can be provided by a specific web server, the virtual MNC can indicate the uniform resource locator (URL) or IP address of the web server.

Meanwhile, the additional service identity unit 260 can be mounted inside of the digital processing device 200, and the subscriber identity unit 250 can mounted outside of the digital processing device 200.

In case that the digital processing device 200 is embodied in the aforementioned forms, if the subscriber identity unit 250 is not coupled, it is possible that the additional service subscriber 260 is used so as to access the communication network by using the information stored in the built-in additional service identity unit 260.

Particularly, in case that the communication network is the mobile communication network of the WCDMA (Wideband Code Division Multiple Access) or GSM (Global System for Mobile communication) method, it is employed as the standard to allow the subscriber identity unit 250 to be mounted in the form of the card in the outside.

Accordingly, in case that the subscriber identity unit 250, mounted in the outside, is inserted into the digital processing device, the mobile communication service is received by using the subscriber identity unit 250. In case that the subscriber identity unit 250 is not coupled, the mobile communication service can be provided by using the built-in additional service identity unit 260.

In addition, the digital processing device 200 can further include a storing unit (not shown) storing data related to the additional service, an operating program of the digital processing device and predetermined algorithm, by the control of the control unit 240.

Examples of actually realizing the additional service identity module in the digital processing device 200 by referring to the configuration of the digital processing device 200 will be described with reference to FIG. 3 through FIG. 5.

Figure 3:
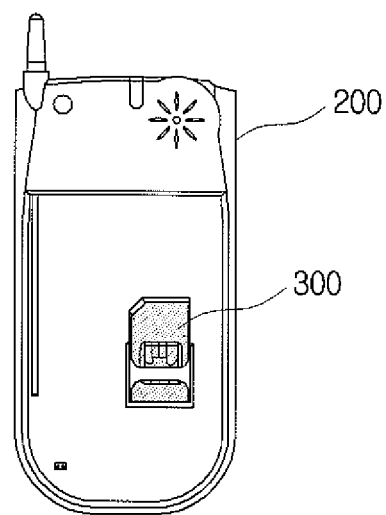
FIG. 3 is an example illustrating an additional service module realized on a portable terminal in accordance with an embodiment of the present invention.
Figure 4:
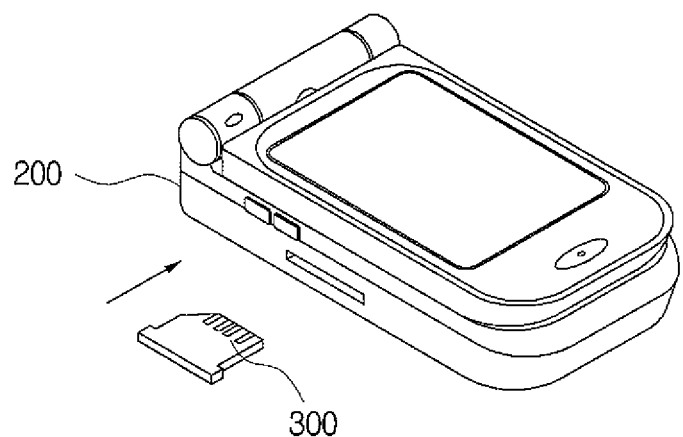
FIG. 4 is an example illustrating an additional service module realized on a portable terminal in accordance with another embodiment of the present invention.

FIG. 3 is an example illustrating an additional service module realized on a portable terminal in accordance with an embodiment of the present invention, and FIG. 4 is an example illustrating an additional service module realized on a portable terminal in accordance with another embodiment of the present invention.

First, as illustrated in FIG. 3, an additional service identity module 300 can be mounted through an interface provided in a part of the portable terminal, which is one of the types of the digital processing device 200, to be connected to the portable terminal.

As illustrated in FIG. 3, the portable terminal, which is one of the types of the digital processing device 200, can be provided with an interface capable of being mounted with the additional service identity module 300, realized in the form of the chip, in a part of the back.

Figure 5:
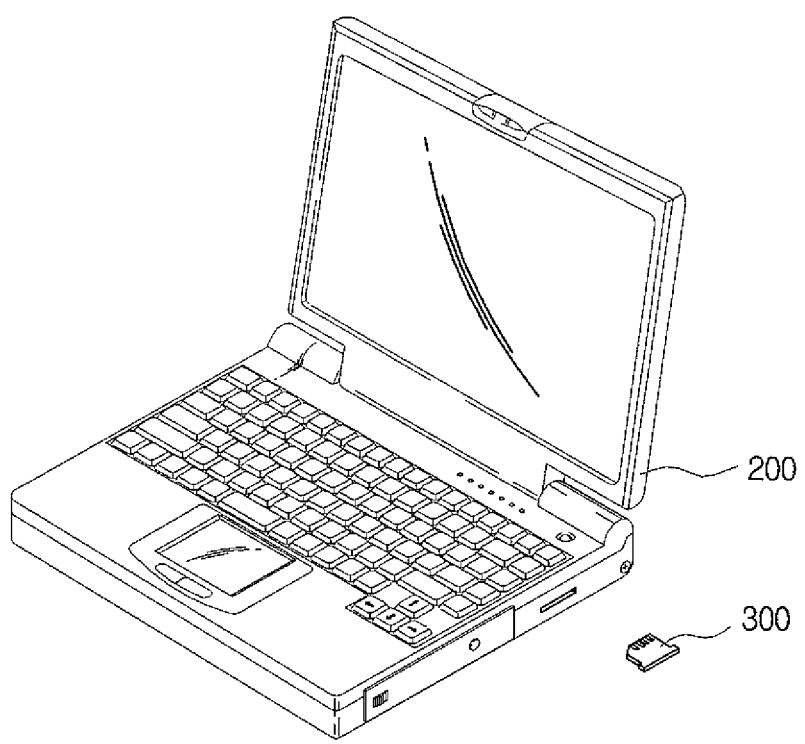
FIG. 5 is an example illustrating an additional service module realized on a laptop computer in accordance with an embodiment of the present invention.

The additional service identity module 300, as illustrated in FIG. 3 through FIG. 5, can be embodied in the form of the chip including information defining the additional service provider providing a specific additional service. Alternatively, the additional service identity module 300 can be realized in the form of the card including this kind of chip.

In addition, as illustrated in FIG. 4, the additional service identity module 300 can be mounted in an interface provided in a side part of the portable terminal.

The digital processing device 200, as illustrated in FIG. 3 and FIG. 4, is not limited to the portable terminal. Any device capable of including the communication function, accessing the communication network and receiving various services can be applied to embodiments of the present invention.

Accordingly, as illustrated in FIG. 5, the user can equip the additional service identity module 300 in a laptop computer having the communication function and access the communication network by using the laptop computer to receive various additional services.

The additional service identity module 300, as described in the examples of FIG. 3 through FIG. 5, can be realized in the form of the chip including the information defining the additional service provider. Alternatively, the additional service identity module 300 can be embodied in the form of the card including this kind of chip. Thus, this kind of chip or card can be mounted inside or outside of the digital processing device.

The additional service provider can provide the additional service identity module 300, embodied in the form of the chip or card stored with information related to the providing of the additional service, to the user using the digital processing device 200.

Accordingly, the user can receive the additional service without additional search by using the digital processing device 200 and a special authenticating operation, and the additional service provider can secure the user using the additional service in advance by pre-providing the chip or card stored with information related to the additional service provider. Thus, the additional service provider can more easily provide the additional service to the user.

In the meantime, as described above, the additional service identity module 300 can be mounted inside of the digital processing device, and the subscriber identity unit 250 can be mounted outside thereof.

In case that the digital processing device 200 is embodied in the aforementioned forms, if the subscriber identity unit 250 is not coupled, it is possible that the additional service identity module 300 is used so as to access the communication network by using the information stored in the built-in additional service identity unit 260.

Particularly, in case that the communication network is the mobile communication network of the WCDMA (Wideband Code Division Multiple Access) or GSM (Global System for Mobile communication) method, since it is employed as the standard to allow the subscriber identity unit 250 to be mounted in the form of the card in the outside, if the subscriber identity unit 250, mounted in the outside, is inserted into the digital processing device, the mobile communication service is received by using the subscriber identity unit 250, and if the subscriber identity unit 250 is not coupled, the mobile communication service can be provided by using the built-in additional service identity module 300.

The structure of a communication system for providing an additional service by using the digital processing device 200 including the additional service identity unit 250 or the additional service identity module 300 will be described with reference with FIG. 6.

The structure of a communication system according to one embodiment of the present invention will be described as compared with that of the typical communication system providing the additional service.

Figure 6:
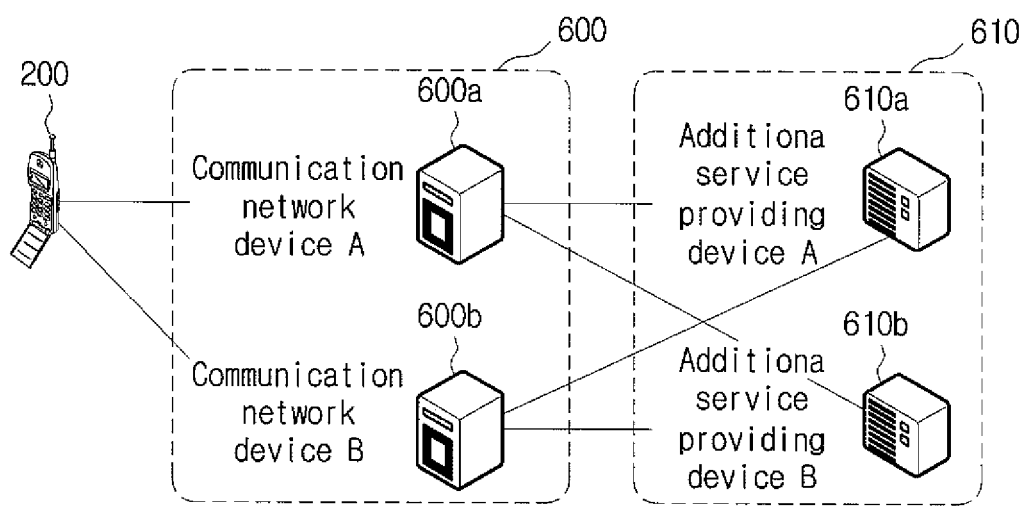
FIG. 6 is an example illustrating a structure of a communication system for providing the application service in accordance with an embodiment of the present invention.

First, as illustrated in FIG. 6, in accordance with an embodiment of the present invention, a communication system for providing the additional service includes the digital processing device 200, communication network devices 600a and 600b, additional service providing device 610a and 610b.

The digital processing device 200 includes the aforementioned additional service identity module 300. Any device capable of including the communication function and accessing the communication network devices 600a and 600b is not limited to be used as the digital processing device 200.

The digital processing device 200, as described above, can be a personal digital assistant (PDA), a mobile communication terminal (mobile phone) and a laptop computer.

The digital processing device is connected to the additional service providing devices 610a and 610b through the communication network devices 600a and 600b. A communication network includes a mobile communication network and Internet.

Also, the Internet includes all international open network structures providing TCP/IP protocol and various service provided in an upper layer, that is, HTTP (HyperText Transfer Protocol), Telnet, FTP (File Transfer Protocol), DNS (Domain Name System), SMTP (Simple Mail Transfer Protocol), SNMP (Simple Network Management Protocol) and NFS(Network File Service).

The mobile communication network can be structured by including elements such as an access gateway and a packet data serving node (PDSN), capable of receiving and transmitting wireless packet, in addition to a base station (BS), a mobile telephone switching office (MTSO) and a home location register (HLR).

The difference between the communication system in accordance with the embodiment of the present invention and the typical communication system will be described with reference to these elements of the communication system.

First, as illustrated in FIG. 1, in the case of receiving the additional service through the digital processing device 100, the communication network devices 110 and 110b, which is connectable to the digital processing device 100, are limited to the communication network device (e.g. 110a in FIG. 1) of the communication operator that a user subscribed to.

Conversely, in the communication system according to one embodiment of the present invention as illustrated in FIG. 6, if the digital processing device 200 selects and drives the additional service identity module, the digital processing device 200 can access any communication device 600 without any limitation of the communication device 600 of a specific communication operator. The digital processing device 200 must have a frequency band and a signal transmitting method, which are identical to the communication device 600 of the specific communication operator, and the communication device 600 must recognize the MNC included in an access request message, in order that the digital processing device 200 is connected to the communication device 600.

This description is based on the MNC but does not consider other components for accessing the communication network device 600, for example, the frequency band and the signal transmitting method.

However, the digital processing device 200 recognizes the communication network device 600 at the periphery where the digital processing device 200 such that the addition service request message can be generated by using the appropriate frequency band and signal transmitting method.

The generated additional service request message can be transmitted to the communication network device 600 close to the digital processing device 200 and be transmitted to the additional service providing device 610.

Accordingly, the communication network device 600 according to one embodiment of the present invention can receive the additional service request message having a virtual MNC of the additional service provider from the digital processing device 200 and transmit the additional service request message to the additional service providing device 610 providing the additional service corresponding to the virtual MNC.

As illustrated in FIG. 1, the typical communication network devices 110a and 110b are connected to each other through a network coupling device in order that the digital processing device 100 subscribing to a special communication operator is connected to the additional service providing device 120, connected to the only communication network device 110b of another communication operator.

Referring to the example of FIG. 1, the communication network device that the digital processing device 100 can access is a communication network device A 110a, and an additional service device A 120a is connected to the communication network device A 110a. In the meantime, the communication network device provided by another communication operator is a communication network device B 110b, and an additional service device B 120b is connected to the communication network device B 110b. In this case, the communication network device A 110a and the communication network device B 110*b*, respectively, provided by each communication operator must be connected to each other in order to receive the additional service provided by the additional service device B 120*b* by using the digital processing device. Beside that, authentication information according to subscriber information, included in the subscriber identity module, must be transmitted to the communication network device B 110*b*.

Conversely, in the communication system according to one embodiment of the present invention as illustrated in FIG. 6, the digital processing device 200 can access any one of a communication network device A 600*a* and a communication network device B 600*b*, respectively, provided by the different communication operators. Accordingly, unlike the typical communication system, although the communication network device A 600*a* and the communication network device B 600*b*, respectively, provided by the different communication operators are not necessarily connected to each other, the user of the digital processing device 200 can receive the additional service provided by any one of the communication network device A 600*a* and the communication network device B 600*b*. Beside that, since authentication information related to the respective additional service providing devices has already been included in the additional service identity module 300 and is transmitted, an additional authenticating process for providing the additional service is not requested.

In accordance with an embodiment of the present invention, the order of receiving an additional service will be described by referring to the communication system capable of providing the additional service by using the digital processing device 200 including the additional service identity module 300 according to one embodiment of the present invention.

Figure 7:
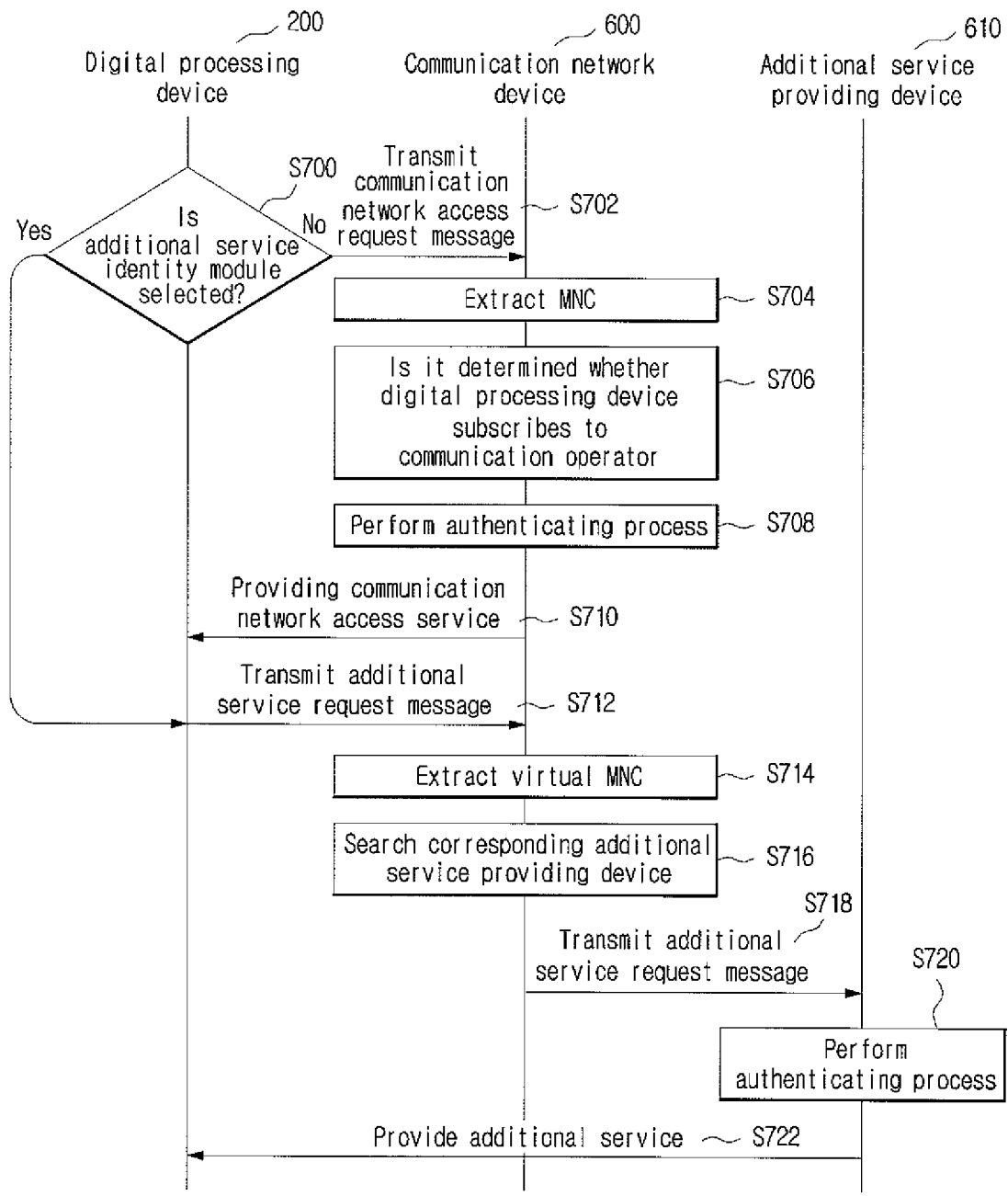
FIG. 7 is a flow chart illustrating the order of receiving an additional service by using a digital processing device including an additional service module in accordance with an embodiment of the present invention.

FIG. 7 is a flow chart illustrating the order of receiving the additional service by using the digital processing device 200 including an additional service module in accordance with an embodiment of the present invention.

First, as illustrated in FIG. 7, in accordance with an embodiment of the present invention, a user selects and drives one of the subscriber identity unit 250 and the additional service identity unit 260, included in the digital processing device 200, in a step represented by S700. The subscriber identity unit 250 and the additional service identity unit 260, as described above, can be realized in a form of a chip, card, or program and be mounted inside or outside of the digital processing device 200.

First, in case that the user selects the subscriber identity module through the digital processing device 200, the digital processing device 200 generates a communication network access request message by using information stored in the subscriber identity unit 250 and transmits the generated communication network access request message to the communication network device 600 in a step represented by S702. The information stored in the subscriber identity unit 250 can include an MNC referring to an identity code of the communication operator and authentication, charging and security information of the user of the digital processing device.

The communication network device 600 extracts the MNC included in the received communication network access request message in a step represented by S704 and determines whether the digital processing device 200 subscribes to the communication operator providing the communication network device 600 in a step represented by S706.

If it is determined that the digital processing device 200 subscribes to the communication operator providing the communication network device 600, the communication network device 600 extracts authentication information included in the received communication network access request message and performs the authenticating process of the user of the digital processing device 200 in a step represented by S708. As a result, if it is the user is authenticated as the subscriber, the communication network device 600 transmits the result of requesting to access the communication network to the digital processing device 200 to be connected to the digital processing device 200 in a step represented by S710. Once the digital processing device 200 and the communication network device 600 are connected to each other, the communication network device 600 can provide the communication service such as a call and wireless Internet through the digital processing device 200.

on the other hand, if the user selects and drives the additional service identity unit 260, the digital processing device 200 generates an additional service request message including information stored in the additional service identity unit 260 and transmits the generated additional service request message to the communication network device 600 in a step represented by S712. The information stored in the additional service identity unit 260 can include a virtual MNC referring to an identity code of the communication operator and authentication, charging and security information of the user of the digital processing device.

The communication network device 600, which has received the additional service request message, extracts the virtual MNC included in the additional service request message, similarly to the case of receiving the communication network access request message, in a step represented by S714.

If it is determined that the extracted virtual MNC is not the MNC of the communication operator providing the communication network device 600, the communication network 600 searches the additional service providing device 610 corresponding to the extracted virtual MNC in a step represented by S716.

The communication network device 600 transmits the received the additional service request message to the searched additional service providing device in a step represented by S718. The additional service providing device, which has received the additional service request message, performs the authenticating process according to the authentication information included in the additional service request message.

As the result of the authenticating process, if it is the user is authenticated as the subscriber, the additional service providing device 610 transmits the result of requesting to provide the additional service through the communication network device 600. After that, the additional service providing device 610 performs the transmission of additional service data according to the request of the additional service data requested through the communication network device 600 to provide the additional service in a step represented by S722.

The transmitted additional service data can be encoded and be transmitted to the digital processing device 200 through the communication network device 600. In this case, the digital processing device 200 can further include means for decoding the encoded additional service data.

The digital processing device 200 including the additional service identity module according to one embodiment of the present invention can structure the additional service identity module by including the virtual MNC of the additional service provider, to thereby be capable of receiving various additional services without the subscription to the communication service of a specific communication operator. Accordingly, the additional service provider can provide the additional service to the user of the digital processing device independently of the communication operator. Although the user subscribes to a specific communication operator, the user can use various additional services provided by another additional service provider as well as the specific communication operator.

As described above, the additional service identity module 300 can be mounted inside of the digital processing device 200, and the subscriber identity unit 250 can be mounted outside of the digital processing device 200.

In this case, the order of identifying the additional service identity module 300 and the subscriber identity unit 250 will be described with reference to FIG. 8.

Figure 8:
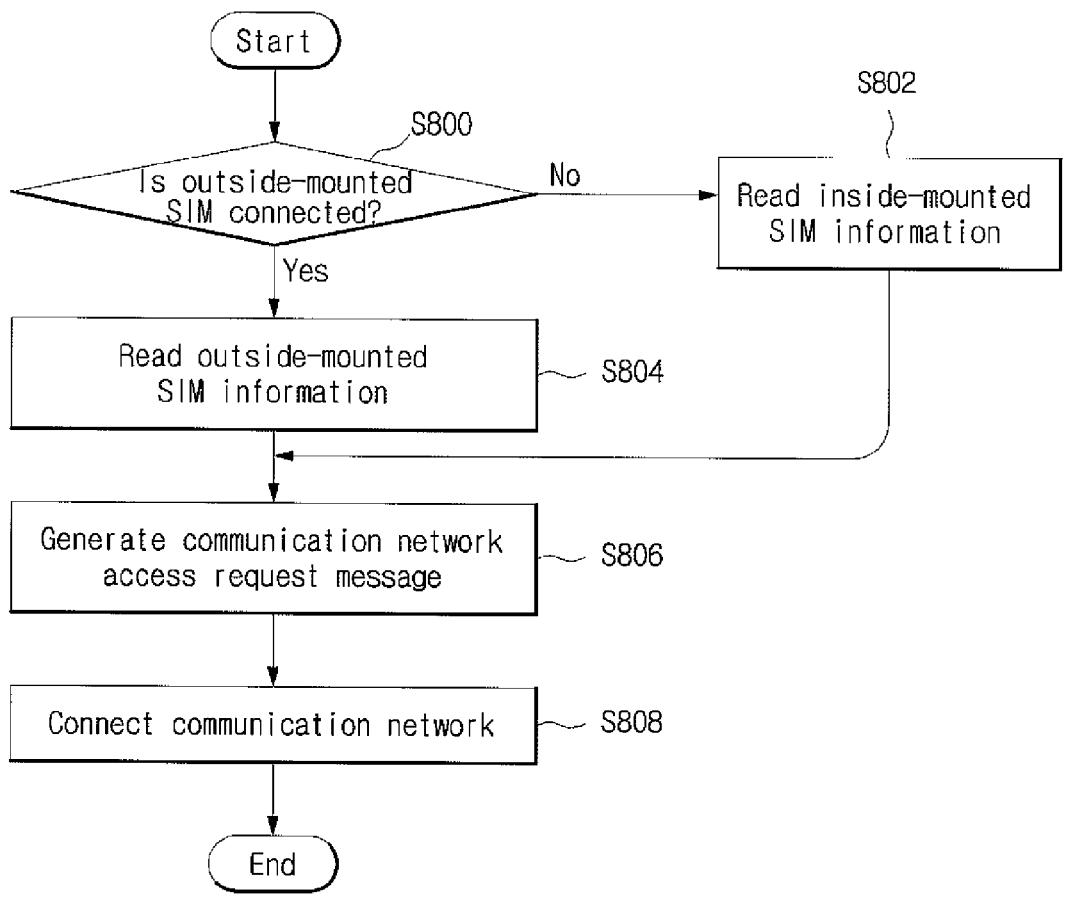
FIG. 8 is a flow chart illustrating the order of identifying an additional service identity module and a subscriber identity module in the case of mounting inside the additional service identity module and outside the subscriber identity module, in accordance with an embodiment of the present invention.

FIG. 8 is a flow chart illustrating the order of identifying an additional service identity module and a subscriber identity module in the case of mounting inside the additional service identity module and outside the subscriber identity module, in accordance with an embodiment of the present invention.

Since the additional service identity module is mounted in the inside in FIG. 8, the additional service identity module is called an inside-mounted subscriber identity module (SIM) or a default SIM. Since the subscriber identity module is mounted in the outside, the subscriber identity module is called an outside-mounted SIM.

As illustrated in FIG. 8, first, it is identified that the outside-SIM is inserted into and is connected to the digital processing device 200 in a step represented by S800.

The connection of the outside-mounted SIM can be identified by transferring an interrupt signal, provided from an outside SIM connection unit by the connection of the outside-mounted SIM, to the control unit of the digital processing device 200.

If the connection of the outside-mounted SIM is not identified, information (e.g. authentication information, security information and charging information) necessary to access the communication network is read from the built-in default SIM in a step represented by S802.

Conversely, if the connection of the outside-mounted SIM is identified, the information (e.g. authentication information, security information and charging information) necessary to access the communication network is read from the outside-mounted SIM in a step represented by S804.

A communication network access request message is generated by using the read information in a step represented by S806. The generated request message is transferred to the communication system to perform a voice call or the connection to the Internet network in a step represented by S808.

By further including the built-in default SIM in the digital processing device 200 that can use the communication method based on the output-mounted SIM as the standard (e.g. WCDMA), the user can omit the troublesome process connecting the SIM one by one whenever the device receiving the communication service is changed.

By further including the charging information in the SIM, even though the mobile communication operators are different from each other, the communication network device of each mobile communication operator can communicate with the digital processing device 200 of the user though the default SIM and recognize location information of the user's digital processing device 200.

Accordingly, although the user does not subscribe to the communication service of a specific communication operator, the user can receive various communication services, for example, special services, regardless of the subscription to the communication service, such as an emergency service and a lost article finding service.

According to at least one embodiment of the present invention, a user of the digital processing device can receive an additional service without his or her subscription to a specific communication operator.

Since it is possible that the user of the digital processing device receives the additional service without the subscription to the specific communication operator, an additional service provider is able to independently provide the additional service to the user.

Also, the user can use various additional services in addition to the additional services provided by the subscribed communication operator.

Particularly, in the case of mounting an additional service identity unit inside of the digital processing device and a subscriber identity unit outside of the digital processing device, if the subscriber identity unit is lost or damaged in a mobile communication network that is based on the case of mounting the subscriber identity unit in the outside, such as an WCDMA method or a GSM method as the standard, the mobile communication service can be provided.

While the above description has pointed out novel features of the invention as applied to various embodiments, the skilled person will understand that various omissions, substitutions, and changes in the form and details of the device or process illustrated may be made without departing from the scope of the invention. Embodiments of the invention can also be applied to non-video data. Therefore, the scope of the invention is defined by the appended claims rather than by the foregoing description. All variations coming within the meaning and range of equivalency of the claims are embraced within their scope.

What is claimed is:

1. A digital processing device for accessing a communication network and receiving an additional service, the device comprising:
    an input unit configured to receive a signal;
    a subscriber identity module configured to store an identity code of a communication operator and generate a communication network access request message;
    an additional service identity module configured to store an identity code of an additional service operator, subscriber authentication information related to the additional service operator and generate an additional service request message; and
    a control unit configured to generate, based on the received signal, a control signal configured to selectively drive one of the subscriber identity module and the additional service identity module,
    wherein the subscriber identity module is configured to communicate data with a communication network device corresponding to the identity code of the communication operator when the subscriber identity module is driven, and the additional service identity module is configured to communicate data with an additional service providing device corresponding to the identity code of the additional service operator via the communication network device corresponding to the identity code of the communication operator in one case and via a further communication network device not corresponding to the identity code of the communication operator in another case when the additional service identity module is driven, and
    wherein the additional service comprises at least one of a video game service, a music service and a broadcasting service.

2. The device of claim 1, wherein the subscriber identity module is further configured to store subscriber authentication and charging information related to the communication operator.

3. The device of claim 1, wherein at least one of the subscriber identity module and the additional service identity module is plurally provided.

4. The device of claim 1, wherein at least one of the subscriber identity module and the additional service identity module is located outside the digital processing device in the form of a card or chip.

5. The device of claim 4, wherein the additional service identity module is formed inside the digital processing device, and the subscriber identity module is located outside the digital processing device.

6. A method of providing an additional service via an additional service providing device, the method comprising:
receiving an additional service request message, via a digital processing device, from a communication network device, wherein the digital processing device and communication network device are in data communication with the additional service providing device, wherein the digital processing device comprises an additional service identity module and is configured to generate the additional service request message, and wherein the additional service request message comprises an additional service identity code and the authentication information;
extracting authentication information from the additional service request message; and
transmitting additional service data according to the extracted authentication information,
wherein the additional service identity module is configured to communicate data with the additional service providing device corresponding to the additional service identity code of the additional service provider via a communication network device corresponding to an identity code of a communication operator in one case and via a further communication network device not corresponding to the identity code of the communication operator in another case when the additional service identity module is driven, and
wherein the additional service comprises at least one of a video game service, a music service and a broadcasting service.

7. The method of claim 6, wherein the transmitting comprises encoding the additional service data, and the encoded additional service data is decoded in the digital processing device.

8. The method of claim 6, wherein the additional service identity code and the authentication information are stored in a memory located inside or outside the digital processing device.

9. The method of claim 6, wherein the additional service identity module is located inside the digital processing device, and a subscriber identity module is located outside the digital processing device.

10. The method of claim 6, wherein the connection of a subscriber identity module is identified by the use of an interrupt signal generated if the subscriber identity module is connected.

11. One or more non-transitory processor-readable storage devices having processor-readable code, the processor-readable code which, when executed by one or more processors, performs a method of providing an additional service via an additional service providing device, the method comprising:
receiving an additional service request message, via a digital processing device, from a communication network device, wherein the digital processing device and communication network device are in data communication with the additional service providing device, wherein the digital processing device comprises an additional service identity module and is configured to generate the additional service request message, and wherein the additional service request message comprises an additional service identity code and the authentication information;
extracting authentication information from the additional service request message; and
transmitting additional service data according to the extracted authentication information,
wherein the additional service identity module is configured to communicate data with the additional service providing device corresponding to the additional service identity code of the additional service provider via a communication network device corresponding to an identity code of a communication operator in one case and via a further communication network device not corresponding to the identity code of the communication operator in another case when the additional service identity module is driven, and
wherein the additional service comprises at least one of a video game service, a music service and a broadcasting service.

12. The storage devices of claim 11, wherein the additional service identity module is located inside the digital processing device, and a subscriber identity module is located outside the digital processing device.

13. An additional service providing system, which provides an additional service to a digital processing device including an additional service identity module and a subscriber identity module, configured to store a communication operator identity code and generate a communication network request message, the system comprising:
a first communication network device configured to receive an additional service operator identity code and an additional service providing request message from the digital processing unit, wherein the additional service providing request message comprises additional service authentication information and an additional service operator identity code; and
an additional service providing device configured to receive the additional service providing request message from the first communication network device and transmit additional service data to the digital processing device, wherein the first communication network device is further configured to extract the additional service operator identity code from the additional service providing request message, and transmit the additional service providing request message to the additional service providing device corresponding to the extracted additional service operator identity code, and
wherein the subscriber identity module is configured to communicate data with a second communication network device corresponding to the identity code of the communication operator when the subscriber identity module is driven, and the additional service identity module is configured to communicate data with the additional service providing device corresponding to the additional service operator identity code via the second communication network device corresponding to the identity code of the communication operator in one case and via the first communication network device not corresponding to the identity code of the communication operator in another case when the additional service identity module is driven, and wherein the additional service comprises at least one of a video game service, a music service and a broadcasting service.

14. The system of claim 13, wherein the digital processing device is configured to store the additional service identity code and the authentication information in a memory located inside or outside the digital processing device.

15. The system of claim 13, wherein the additional service providing device is further configured to encode the additional data, and wherein the digital processing device is further configured to decode the encoded additional service data.

16. The system of claim 13, wherein the additional service identity module is located inside the digital processing device, and the subscriber identity module is located outside the digital processing device.

17. A digital processing device for accessing a communication network and receiving an additional service, the device comprising:

a receiver configured to receive a signal;

a subscriber identifier configured to store an identity code of a communication operator and generate a communication network access request message;

an additional service identifier configured to store an identity code of an additional service operator and generate an additional service request message; and a controller configured to generate, based on the received signal, a control signal configured to selectively drive one of the subscriber identifier and the additional service identifier, wherein the subscriber identifier is configured to communicate data with a communication network device corresponding to the identity code of the communication operator when the subscriber identifier is driven, and the additional service identifier is configured to communicate data with an additional service providing device corresponding to the identity code of the additional service operator via the communication network device corresponding to the identity code of the communication operator in one case and via a further communication network device not corresponding to the identity code of the communication operator in another case when the additional service identifier, and wherein the additional service comprises at least one of a video game service, a music service and a broadcasting service.

18. The device of claim 1, wherein the identity code is a mobile network code of the additional service operator.

* * * * *